United States Patent
McAllister

(10) Patent No.: US 7,551,087 B2
(45) Date of Patent: Jun. 23, 2009

(54) HANDHELD AND CARTRIDGE-FED APPLICATOR FOR COMMISSIONING WIRELESS SENSORS

(75) Inventor: Clarke McAllister, Eugene, OR (US)

(73) Assignee: Adasa, Inc., Eugene, OR (US)

( * ) Notice: Subject to any disclaimer, the term of this patent is extended or adjusted under 35 U.S.C. 154(b) by 289 days.

(21) Appl. No.: 11/550,376

(22) Filed: Oct. 17, 2006

(65) Prior Publication Data

US 2007/0125836 A1 Jun. 7, 2007

Related U.S. Application Data

(63) Continuation-in-part of application No. 11/465,712, filed on Aug. 18, 2006.

(60) Provisional application No. 60/729,737, filed on Oct. 24, 2005, provisional application No. 60/709,713, filed on Aug. 19, 2005.

(51) Int. Cl.
*G08B 13/14* (2006.01)
*G06K 7/10* (2006.01)
(52) U.S. Cl. ............... 340/572.1; 235/462.01
(58) Field of Classification Search ... 340/10.51–10.52, 340/572.1–572.4; 235/462.01–462.49, 385; 400/76
See application file for complete search history.

(56) References Cited

U.S. PATENT DOCUMENTS

| | | | |
|---|---|---|---|
| 5,227,617 A | 7/1993 | Christopher et al. | |
| 6,246,326 B1 | 6/2001 | Wiklof et al. | |
| 6,279,638 B1 | 8/2001 | Goodwin et al. | |
| 6,280,544 B1 | 8/2001 | Fox et al. | |
| 6,332,098 B2 | 12/2001 | Ross et al. | |
| 6,379,058 B1 | 4/2002 | Petteruti et al. | |
| 6,409,401 B1 | 6/2002 | Petteruti et al. | |
| 6,415,978 B1 | 7/2002 | McAllister | |
| 6,478,229 B1 | 11/2002 | Epstein | |
| 6,481,907 B2 | 11/2002 | Banach et al. | |
| 6,517,700 B2 | 2/2003 | McAllister et al. | |
| 6,532,346 B2 | 3/2003 | Gallivan | |
| 6,805,183 B2 | 10/2004 | Goodwin et al. | |
| 6,830,181 B1 * | 12/2004 | Bennett | 235/440 |
| 6,848,616 B2 | 2/2005 | Tsirline et al. | |
| 6,857,714 B2 | 2/2005 | Hohberger et al. | |
| 6,884,312 B2 | 4/2005 | Mitchell et al. | |
| 6,899,476 B1 | 5/2005 | Barrus et al. | |
| 6,963,351 B2 | 11/2005 | Squires et al. | |
| 7,066,667 B2 | 6/2006 | Chapman | |
| 7,069,251 B1 | 6/2006 | Bartz et al. | |
| 7,073,712 B2 | 7/2006 | Jusas et al. | |
| 7,075,435 B2 | 7/2006 | Jesser et al. | |
| 7,114,655 B2 * | 10/2006 | Chapman et al. | 235/462.01 |
| 7,320,432 B2 * | 1/2008 | Sureaud et al. | 235/462.43 |

(Continued)

*Primary Examiner*—Benjamin C Lee
*Assistant Examiner*—Sigmund Tang
(74) *Attorney, Agent, or Firm*—Peter A. Haas, Esquire LLC

(57) ABSTRACT

An integrated, hand-held device combining optical bar-code reading means with RFID-transponder commissioning means includes an on-board processing means, such as a portable-data-terminal that releasably couples to the device and wireless communicates with a host or network computer and seamlessly integrates data communication to and from the optical reader means and the commissioning means. A rechargeable battery pack provides power to each component and a single trigger mechanism enables multi-modal operation based on sensed conditions. Blank or pre-encoded RFID-transponders are supplied by a replaceable cartridge.

19 Claims, 9 Drawing Sheets

U.S. PATENT DOCUMENTS

| | | |
|---|---|---|
| 2002/0005774 A1 | 1/2002 | Rudolph et al. |
| 2003/0227528 A1 | 12/2003 | Hohberger et al. |
| 2004/0074964 A1 | 4/2004 | Falkenrich-Wesche |
| 2004/0124235 A1 | 7/2004 | White et al. |
| 2004/0141790 A1* | 7/2004 | Waters ........................ 400/611 |
| 2005/0045724 A1 | 3/2005 | Tsirline et al. |
| 2005/0218219 A1* | 10/2005 | Sano et al. ................... 235/383 |
| 2006/0080819 A1 | 4/2006 | McAllister |

* cited by examiner

HANDHELD AND CARTRIDGE-FED APPLICATOR FOR COMMISSIONING WIRELESS SENSORS

RELATED APPLICATIONS

The present application claims benefit under 35 USC Section 119(e) of U.S. Provisional Patent Application Ser. No. 60/729,737, filed on 24 Oct. 2005. And, the present application is a continuation-in-part of U.S. patent application Ser. No. 11/465,712 filed on 18 Aug. 2006, which claims benefit under 35 USC Section 119(e) of U.S. Provisional Patent Application Ser. No. 60/709,713 filed on 19 Aug. 2005. The present application is based on and claims priority from these applications, the disclosures of which are hereby expressly incorporated herein by reference.

BACKGROUND

The present invention relates to a system, including methods and devices, utilizing wireless sensor devices and RFID (radio-frequency identification) transponders. Specifically, the present invention relates to a system incorporating novel devices and methods that enable point-of-use and on-demand commissioning of RFID transponder-equipped wireless sensors.

Radio-frequency identification (RFID) transponders enable improved identification and tracking of objects by encoding data electronically in a compact tag or label. And, advantageously, the compact tag or label does not need external, optically recognizable or human-readable markings. In fact, using the Gen2 EPC specification, a three-meter read-distance for RFID transponders is common—even on high-speed material handling lines.

Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification. Commissioning, the process of encoding specific information (for example, data representing an object identifier, the date-code, batch, customer name, origin, destination, quantity, and items) associated with an object (for example, a shipping container), associates a specific object with a unique RFID transponder. The commissioned transponder responds to coded RF signals and, therefore, readily can be interrogated by external devices to reveal the data associated with the transponder.

Current classes of RFID transponders rank into two primary categories: active RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to specially designed remote devices such as interrogators.

Combining the benefits of the latest technology in RFID transponders with sensing devices, a broader class of devices called wireless sensors is emerging. Wireless sensors have a unique identity, sense one or more attributes within its environment, and report its identity and data corresponding to the sensed attributes. For example, a wireless sensor interprets environmental conditions such as temperature, moisture, sunlight, seismic activity, biological, chemical or nuclear materials, specific molecules, shock, vibration, location, or other environmental parameters. Wireless sensors are distributed nodes of computing networks that are interconnected by wired and wireless interfaces.

Wireless sensors, made using silicon circuits, polymer circuits, optical modulation indicia, an encoded quartz crystal diode, or Surface Acoustic Wave (SAW) materials to affect radio frequency or other signaling methods, communicate wirelessly to other devices. For example, certain embodiments of wireless sensors communicate on a peer-to-peer basis to an interrogator or a mobile computer. Communication methods include narrow band, wide band, ultra wide band, or other means of radio or signal propagation methods.

Additional examples of RFID transponders, wireless tags, and wireless sensors are more fully discussed this inventor's co-pending U.S. Patent Application Publication No. 2006/0080819, entitled "Systems and Methods for Deployment and Recycling of RFID Tags, Wireless Sensors, and the Containers Attached thereto," published on 20 Apr. 2006, which is expressly incorporated by reference for all purposes as if fully set forth in this document.

One problem of prior-art systems, such as conventional print labels or barcode systems, includes a requirement for line-of-sight and an overdependence on the optical quality of the label. Many factors can render such a label unreadable including printing errors, excess ink, insufficient ink, physical destruction of the markings, obstruction of the markings due to foreign matter, and, in extreme cases, outright deception by placing an altered label over the top of such a print label.

RFID-transponder labeling eliminates the need for an optically readable print label and overcomes all of the shortcomings related to print quality and the need for a line-of-sight to scan the label. Moreover, RFID-transponder labels enable secure data encryption, making outright deception considerably less likely to occur. However, current RFID label systems have their own limitations as well.

For example, certain prior art systems, represented by U.S. Pat. No. 7,066,667 issued to Chapman et al. on 27 Jun. 2006, U.S. Pat. No. 6,899,476 issued to Barrus et al. on 31 May 2005, or U.S. Pat. No. 6,246,326 issued to Wiklof et al. on 12 Jun. 2001, describe a device that commissions an RFID transponder with a printed label. This approach, however, introduces unnecessary waste, cost, and propensities for error. There is a growing category of applications that do not require anything other than a custom-encoded RFID transponder. This prior art calls for the inclusion of label printer hardware and related consumable materials that are not necessary for many RFID applications. Unneeded printer mechanisms create unnecessary complexities, size, and weight. In some instances this additional bulk hinders practical mobile applications. Further shortcomings of traditional approaches include excess waste as printer consumable materials—including ink, toner, or thermal transfer ribbons—must be purchased, inventoried, installed, trained on their proper use, and disposed or recycled.

United States Patent Application No. 2003/0227528 by Hohberger et al. published on 11 Dec. 2003 describes another attempt at improving demand-print labels by providing a device that combines two standard, die-cut rolls of media, one of which may be a roll of RFID transponders, and the second, print-label stock, in an attempt to provide on-demand smart labels. As with the aforementioned references, this approach adds unnecessary cost and complexity by combining RFID transponders with demand-printed labels.

So, despite recent advances in RFID technology, the state-of-the-art does not fully address the needs of efficient, economical, high-volume, cost-effective, reliable deployment and commissioning of RFID transponders and wireless sensors. And, large-scale adoption and deployment of RFID transponders depends on systems utilizing reliable, low-cost transponders and efficient commissioning means. Such systems should further include compliance with Gen2 EPC specifications or ISO standards, enable a plurality of printer-emulation modes, enable wireless connectivity—for example, in accordance with the IEEE 802.11b wireless LAN standards-based communications—provide various levels of WLAN security, efficient replenishment of programmable transponder supplies, and enable secure software re-programming to adapt to future demands and improvements.

SUMMARY OF THE INVENTION

The present invention is directed to improved systems for commissioning wireless tags, RFID tags, and wireless sensors. The present inventors have recognized that significant benefits can be realized from using wireless sensors that are not directly part of a demand printed label. Among them include improved deployment yield and efficiency, and greater mobility for the transponder commissioning process. RFID transponders pre-loaded into cartridges prior to consumption adds significant convenience of loading RFID transponders and overall reliability of the handling and applying of the RFID transponders and also includes significant labor savings over current methods of hand loading loose rolls of RFID transponders into RFID applicators. Similar benefits have been realized with cartridges in semi-automatic weapons, preloaded film canisters, and inkjet printers. The business process of utilizing portable applicators is radically improved over current methods resulting in significant labor savings. Similar savings have been realized through the use of portable bar code printers and portable data terminals.

The present invention overcomes the shortcomings of the prior-art attempts and, accordingly, provides systems, methods, and devices that read print or bar-code labels and then in real-time commission RFID transponders at a point-of-use utilizing wireless data transfer in a compact package that is well-suited to portable, mobile, or fixed use in multiple applications. Further advantages of the present invention will be well-appreciated by those skilled in the art upon reading this disclosure including the appended figures of the drawing.

One embodiment of the present invention includes a device for commissioning radio frequency identification (RFID) transponders, the device comprises an optical reader means for reading bar-code labels; a processing means adapted to communicate with the optical reader means; an RFID-transponder commissioning means adapted to communicate with the processing means; a cartridge assembly adapted to selectively dispense a plurality of RFID transponders in response to at least one input, and the cartridge releasably coupled to the RFID-transponder commissioning means; a power-supply means in communication with the processing means, the power-supply means further adapted to provide power to the processor means, the optical reader means, the RFID-transponder commissioning means and the cartridge assembly; a trigger mechanism adapted to provide input to the processing means; and an output-display means for outputting data and adapted to communicate with the processing means.

The device further includes a wireless data-exchange means adapted to enable wireless data transfers to and from each the optical reader means, the processing means and the RFID-transponder commissioning means.

The power-supply means further comprises a replaceable and rechargeable lithium-ion battery.

The device also includes a keypad input means arranged on the chassis and in communication with the processing means.

The output-display means further comprises a liquid-crystal-display panel.

The processing-means further comprises a portable-data-terminal. The portable-data-terminal comprising: a means for inputting data and a means for outputting data and the portable-data-terminal releasably coupling to the device and adapted to obtain power from the power-supply means; the optical reader means further adapted to provide data representing the information from the bar-code label to the portable-data-terminal; the portable-data-terminal further comprising micro-controller means to transform the data relating to the information from the bar-code label from a first state to a second state.

The device further comprising means for communicating the second state to the RFID-transponder commissioning means, the RFID-transponder commissioning means further adapted to encode the second-state onto the RFID transponder provided by the cartridge.

The means for outputting data comprises a wireless data-sending transmitter.

The RFID-transponder commissioning means further comprises an encoder means for modulating transmitted radio power and adapted to recognize recently commissioned RFID transponders and filter out responses.

The trigger mechanism couples with an electrical switch having one or more stable positions, the one or more stable position being detected by the processing means.

In one alternative, the RFID-transponder commissioning means further comprises an electro-mechanical mechanism including a paddle that wipes across the RFID transponder to enable transfer of a commissioned RFID transponder from the device.

In another alternative, the RFID-transponder commissioning means further comprises an electro-mechanical mechanism including a thumper mechanism that exerts linear force on the RFID transponder to enable transfer of a commissioned RFID transponder from the device.

The device further comprising a sensor means in communication with the processing means, the sensor means being adapted to sense at least one condition.

The device further comprising a tensile-extraction means adapted to enable commissioned RFID-transponders to be discharged from the device using tensile extraction.

In another embodiment of the present invention a device comprises means for protecting RFID transponders within a replaceable enclosure; means for sequentially encoding and reading each RFID transponder; means for dispensing an RFID transponder along a vector that is normal to the face of an object; means for communicating to a wireless network; and sensing means.

This device further comprises a trigger means for enabling functioning dependent upon a detected range from an object.

And, a trigger means for selectively enabling execution of any one of a plurality of functions.

The device further comprising a color or pattern sensing means.

In another embodiment, the present invention includes a method of dispensing RFID transponders mounted to release liner webbing, the method comprising: providing a first data set; providing an RFID transponder; providing a reusable cartridge to contain at least one of the RFID transponders; providing a means to sequentially encode the first data set and/or interrogate RFID transponders within the cartridge; and providing a device for transfer of commissioned transponders from the cartridge onto a selected surface of an object along a vector that is normal to the selected surface.

This method further includes providing a processing means to store the first data set and wirelessly transmit the data set to a downstream processor.

DRAWINGS

DESCRIPTION OF THE INVENTION

Figure 1:
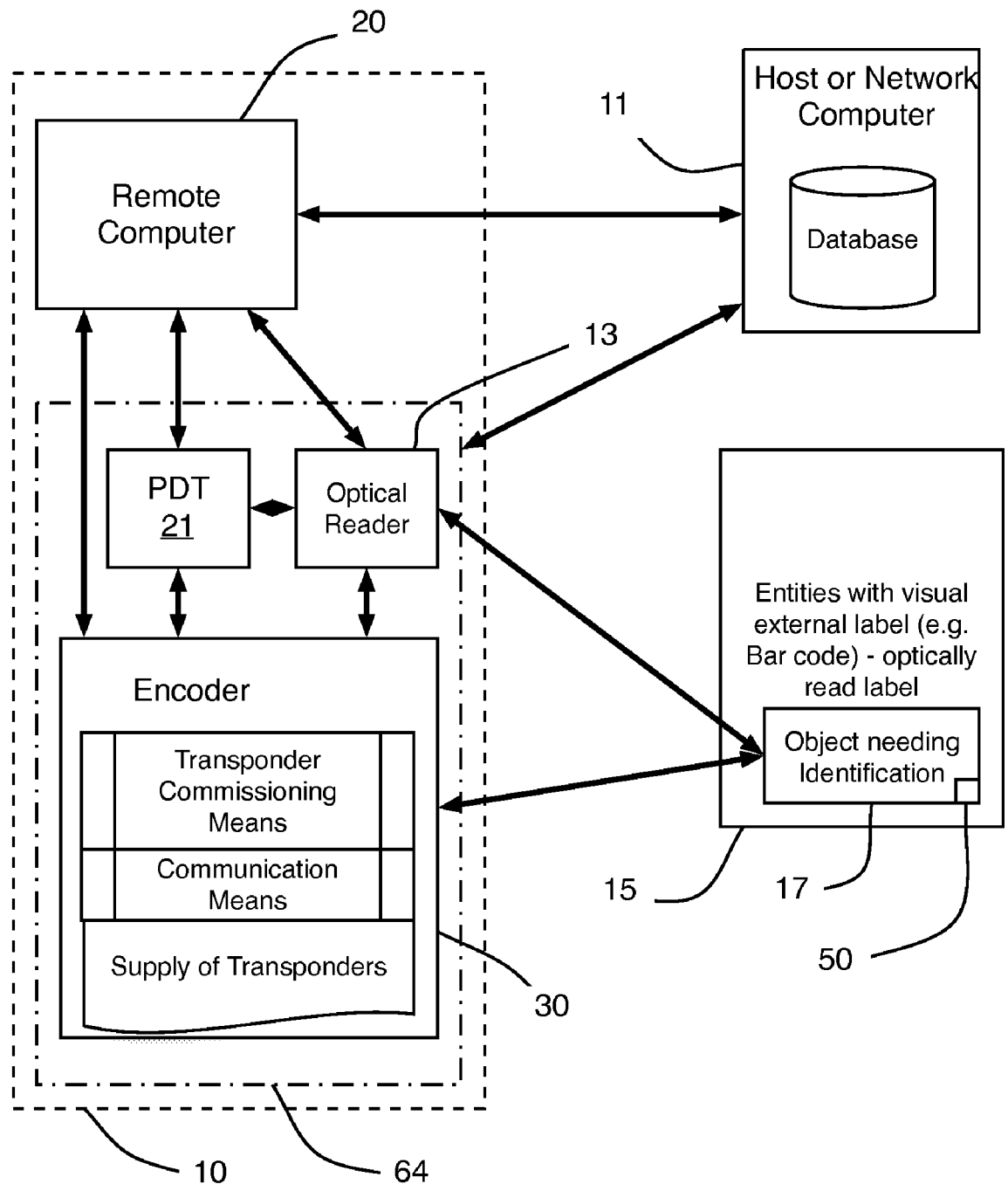
FIG. 1 is schematic block diagram of the system according to one embodiment of the present invention.

Possible embodiments will now be described with reference to the drawings and those skilled in the art will understand that alternative configurations and combinations of components may be substituted without subtracting from the invention. Also, in some figures certain components are omitted to more clearly illustrate the invention.

To clarify certain aspects of the present invention, certain embodiments are described in a possible environment—as identification means for containers. In these instances, certain methods make reference to containers such as loaded pallets, paperboard boxes, corrugated cartons, pharmaceutical containers, and conveyable cases, but other containers may be used by these methods. Certain embodiments of the present invention are directed for use with commercial corrugated shipping cartons, tagged pallet-loads of shrink-wrapped cases, consumer-goods packaging, consumer goods, or other methods of identifying objects using RFID transponders or wireless sensors, or both.

Some terms are used interchangeably as a convenience and, accordingly, are not intended as a limitation. For example, transponders are used interchangeably with the term tags and the term inlay is used interchangeably with inlet. This document generally uses the term tag to refer to passive inlay transponders, which do not include a battery, but include an antenna structure coupled to an RFID chip which are generally a thin and flat and substantially co-planar and located on a substrate. One common type of passive inlay transponder further includes a pressure-sensitive adhesive backing positioned opposite an inlay carrier layer. However, certain aspects of the present invention work equally well with active inlay transponders. A third type: a battery-assist tag is a hybrid RFID transponder that uses a battery to power the RFID chip and a backscatter return link to the interrogator. Further, this document uses programmable RFID transponders interchangeably with RFID transponders. Programmable transponders enable data to be written or stored more than once.

Suitable environments or applications for certain aspects of the present invention include: Traditional conveyor line or other high-speed machinery with automated transponder printing, encoding, and attachment; Hand attachment of transponders (a method that often is referred to as "slap and ship") and a novel category of mobile transponder encoders as will be more fully described herein.

The systems, methods, and devices of the present invention utilize an RFID transponder or wireless sensors as a component. Certain RFID transponders and wireless sensors operate at Ultra High Frequencies (UHF), the band of the electromagnetic spectrum that, for RFID applications, spans from about 860 MHz to 960 MHz. Transponders and tags responsive to this frequency band generally have some form of one or more dipoles in their antenna structure. Such RFID transponders and wireless sensors utilize any range of possible modulation schemes including amplitude modulation, amplitude shift keying (ASK), double-sideband ASK, phase-shift keying, phase-reversal ASK, frequency-shift keying (FSK), time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. UWB wireless sensors may be combined with narrowband, spread spectrum, or frequency-hopping inlays or wireless sensors.

A. System Overview

The present invention includes a system adapted to read bar code labels and then, in real-time, commission wireless sensors at a point of use. For example, in one embodiment, the present invention includes a device that integrates a mobile bar code reader apparatus and an integrated RFID encoder apparatus with a portable data terminal enabling mobile use of the device. The mobile device is in wireless communication with a remotely located host computer. The operator can selectively (on-demand and in real-time) cause the encoder to commission a transponder based on various criteria, including input received from a the reader such as bar code data for example.

FIG. 1 shows one system 10 according to the present invention in a typical environment, such as a packaging facility wherein a collection of entities with visual external labels 15 exist and a sub-set (or all entities) need to be associated with a wireless RFID transponder, tag, or label. The object 17 needing an RFID transponder could be a packing container having an assorted collection of entities 15. As entities 15 are pulled from the collection, the optical reader 13 scans and interprets the visual, external label using on-board software that enables bar code or alpha-numeric character recognition—thus converting the print label to a data-format suitable for storage in a memory device and subsequent utilization by downstream processors and components. As a means of checks and balances, audit control, or inventory management, the information read from the print label correlates to information stored in a centralized location, represented by a network computer 11 having a database. The information read by the optical reader 13 is sent to the remote computer 20 and the system 10 includes a data connection such as a wireless connection between the remote computer 20 and the integrated device 64. This data connection can be a direct, physical connection using cables, or alternatively, via a wireless data transfer interconnect port. Additionally, a wireless connection could occur between the remote computer 20 and the host computer 11.

The device 64 includes both a compact encoder 30 and a compact optical reader 13, configured to enable easy operation and transportation by a human operator. Accordingly, the device 64 includes an on-board power supply, or power supplies. In one example, a common, single power supply such as a grouping of rechargeable lithium-ion batteries powers both the reader 13 and the encoder 30. The device 64 further includes physical structure such as a handle or a belt-clip for ease of use.

The device 64, according to one embodiment of the present invention, includes a personal data terminal (PDT) 21 which is adapted to enable data and command communication between it and each of the subsystems including the optical reader 13 and encoder 30.

In the system 10 of FIG. 1, the compact device 10 includes a mobile encoder 30 having a cartridge carrying a plurality of un-commissioned (or blank) RFID transponders. Once the desired data is accumulated—for example, by a data feed from an on-board computer (not illustrated in FIG. 1), a remote computer 20, a host computer 11, or scanned directly by the integrated optical reader 13—the encoder 30 commissions an RFID transponder, creating an RFID label 50 for the object 17. The commissioned RFID-transponder label 50 can then be applied, linked, or otherwise associated with the object by known means including a human operator or a machine transfer.

The device 64 includes a chassis means for physically locating and coupling each component. The chassis means may be integrated into one component whereby additional components adapt to releasably attach or couple to the integrated chassis. In another embodiment, the chassis means includes a stand-alone chassis body adapted to releasably couple various components direct to its body. Accordingly, the components—such as the PDT 21, the optical reader 13, the on-board power supply, the trigger mechanism 86, the handle 66, or the encoder 30 mechanically attach to the chassis. In a preferred embodiment the components releasably couple to the chassis and electrical and data communication means between the components also releasably couple to enable modularity of the device. Thus, as the power supply needs to be re-charged, it may simply be decoupled from the chassis allowing a different power-supply module to connect to the device and enable power-communication to each of the components. Similarly, when the RFID cartridge is exhausted its supply of RFID-transponders, a new cartridge may simply be inserted. Likewise, should the optical reader, PDT or encoder become inoperable for any reason, the respective component can quickly be swapped with an operable unit in a plug-and-play manner.

In another embodiment, the device 64 attaches to a high-speed conveyor line. In such an application, the on-board battery could be replaced or augmented by a physical connection to a remote power source. Further, the computer 20 could have wired connects to the host network 11. Further details of possible configurations of the mobile encoder will be further detailed in subsequent sections of this disclosure.

B. RFID Transponders

RFID transponders, essentially, comprise an RFID integrated circuit (IC) device (or "chip") bonded to an antenna apparatus, formed on a substrate that is often plastic such as Mylar®, polyester, or PET. One way to form an antenna structure is to etch copper from a substrate. An alternate way includes printing multiple layers of conductive ink onto a substrate. One additional method includes stamping UHF antennae from thin sheets of aluminum. In certain embodiments, RFID transponders and wireless sensors are recovered from waste streams for reconditioning, reprogramming, and reuse.

Other suitable RFID transponders include designs that combine a dielectric spacer behind the antenna to create a transponder that performs well over a broad range of packaging conditions. Foam is a preferred dielectric spacer. A robust design also includes features to protect the transponder from damage.

In certain embodiments, the RFID transponder is both programmable and mechanically configured for tensile extraction from a protective enclosure.

In one embodiment, additional transponder layers include a thin and flexible energy cell comprising two non-toxic, widely-available commodities: zinc and manganese dioxide. One suitable energy cell is developed by Power Paper Ltd. of 21 Yegia Kapayim Street, Kiryat Arye, Petah Tikva, P.O.B. 3353, ISRAEL 49130, and incorporates an innovative process that enables the printing of caseless, thin, flexible and environment-friendly energy cells on a polymer film substrate, by means of a simple mass-printing technology and proprietary inks. The cathode and anode layers are fabricated from proprietary ink-like materials that can be printed onto virtually any substrate, including specialty papers. The cathode and anode are produced as different mixes of ink, so that the combination of the two creates a 1.5-volt battery that is thin and flexible. Unlike conventional batteries, this type of power source does not require casing.

A top layer of an RFID transponder assembly comprises a paper face-stock, which is a very low-cost material but also is the least environmentally resilient. UV-resistant plastic face-stock generally provide the best survivability in outdoor and rough-service environments, and also provide the best protection for the RFID transponder assembly.

A bottom layer of pressure-sensitive adhesive (PSA) often is used for attachment of transponders to objects and often is referred to as a wet inlay or a wet tag or a wet transponder. Alternatively, a layer of clear, translucent, or opaque adhesive-backed film or tape is used to attach the transponder or wireless sensor to object or container. The tape, any thin, low cost, flexible material with a self-adhesive backing, such as a conventional packing tape, is well-suited for this method of attachment. The tape may be formed into various shapes to achieve the requirements of this method. Certain embodiments may use tape that is preprinted with certain logos, marks, symbols, bar codes, colors, and designs. Suitable adhesive-backed tape must not—or at least minimally—absorb radio frequencies within the range of frequencies used by the transponder or tag. The tape material, also, must not corrode the device or otherwise hamper its functionality.

Certain embodiments use a type of packing manufactured specifically for a given encoder. Packing tape can be single-coated pressure-sensitive adhesive tape or, alternatively, media constructed with multiple layers including a backing layer. Certain backing layers are constructed on a plastic film having one or more layers. Certain backing layers are made from plastic resins such as polypropylene (PP), polyethylene (PE), or copolymers of PP, PE, PVC, polyesters, or vinyl acetates. Certain embodiments of PP are mono-axially oriented polypropylene (MOPP), bi-axially oriented polypropylene (BOPP), or sequentially and bi-axially oriented polypropylene (SBOPP). Certain backing layers are biodegradable. Certain backing layers are coated with a pressure sensitive adhesive on one side and a low adhesion release coating on the other side to reduce the amount of power required for the encoder to unroll the tag for application.

Other constructions for RFID transponders include one or more additional layers of dielectric material that encapsulate or substantially cover the inlay. In general, the thicker the dielectric layer the higher the voltage must be to initiate a flow of electrons through a dielectric layer. This results in higher ESD voltage ratings. Also, it is well known to those skilled in the art that thicker dielectric layers between the antenna layer and any other metal or liquid also tends to reduce parasitic loading of the antenna whereby maintaining antenna tuning for proper coupling to interrogators within a specified UHF band. In such embodiments, the integrated circuit chip and antenna bond to an adhesive layer and are protected from a discharge path through the tape layer by its particular thickness of dielectric material. A second dielectric layer bonds to the inlay substrate by a second adhesive layer, so that a low voltage discharge path is non existent around the two layers of tape substrate.

The contemplated adhesives in the various RFID transponder embodiments create strong and permanent bonds between tapes and inlay layers over a certain practical range of operating temperatures.

Because RFID transponders are designed to adhere to a container, one face of an external layer includes a pressure-sensitive adhesive. This external adhesive, however, must not cause mechanisms associated with the commissioning devices to jam. To prevent unwanted sticking of the RFID transponder, a transport layer protects the sticky, external adhesive. The transport layer is either a release liner such as a silicone-treated paper liner or a net (or mesh) web. A net or mesh web offers two principal advantages: less weight and are recyclable or reusable. A comparison of the weight of a net with a higher percentage of open area to a typical sheet of release liner reveals that the netting is lighter for any given section of comparable size. Environmental problems of disposal of release liner are well known. Mesh or netting, comprised of recyclable resins, is recovered after each use so that the mesh or net can be either reused or recycled for its constituent materials.

In one possible embodiment the mesh or netting is made of plastic such as nylon, polypropylene, polyethylene, HDPE, Teflon, or other resins. In other embodiments the mesh or netting is fabricated from metal or carbon-impregnated plastic to provide a conductive path to bleed electric charge away from points of accumulation.

Other advantages of a net or mesh transport layer include a substantial percentage of the adhesive not in contact with anything during storage and commissioning. When stored in a roll, a small percentage of the adhesive layer makes contact with the backside of the roll through the openings in the mesh. Thus, a small amount of energy is required to unroll the spool during transponder commissioning, yet there exists a certain amount of adhesion to prevent a converted spool from unraveling.

In other possible embodiments, the RFID transponders can include a surface suitable for human or machine readable, visible, external markings including bar code symbols or alpha-numeric sequences.

In another possible embodiment, grouping RFID transponders are arranged on sheet stock such as rolls or z-folded sheets. This enables a plurality of transponders to be carried on a continuous web or traditional release liner. Other certain embodiments use transponders that are stacked and loaded into magazines for transport, handling, and automated dispensing. In certain embodiments, the magazines contain metallic shielding to protect transponders and inlays from electrostatic discharges (ESD).

In certain embodiments an RFID encoder is combined with a sensor suite to enable semi-automated tag application to desired objects. In one embodiment, a semi-automatic encoder/applicator is created by integrating a single sensor device. The sensor responds to changes in light, capacitance, pressure, acoustics, or optical path length to a transport container. In another embodiment a suite of sensors are used to detect the attachment location of a commissionable transponder.

For example, changes in capacitance are detectable using certain QProx charge transfer capacitance sensors available from Quantum Research Group Ltd. of Hamble, England. Ultrasonic range sensors are available from supplier such as muRata Manufacturing Co., Ltd. of Kyoto Japan under the trade name Piezotite. Optical path length sensors are available from Keyence Corporation of Osaka, Japan. Sharp manufactures a compact distance-measuring sensor GP2D02 that is responsive in the range from 5 to 100 cm. Thus, when a predetermined set of conditions is realized, the sensor triggers, enables, or selects a desired action. In one embodiment, proximity or contact of sensor suite with the targeted transport container causes a second type of Trigger Event, resulting in the commissioning and dispensing of a transponder by an encoder.

In other embodiments, the sensor is designed to determine the distance an encoder resides from an object that is to be tagged. Range information is acquired and processed in real time to determine if the encoder is in Close Proximity, Near, or Far from a transport container. In certain embodiments a controller is programmed to alter threshold distances between each range category and to associate a function with each range. In certain embodiments, range category Close Proximity is associated with transponder programming and application functions. For example, the range category Near is reserved for transponder verification and/or reading functions; and Far is reserved for bar code scanning functions to verify that bar code information aligns properly with RFID transponder data.

In other embodiments a sensor suite is responsive to certain colors or patterns and use that information to instruct the placement or detect the correct locations for applying good transponders and separate locations for discharging bad transponders.

C. An Integrated Optical Reader and Encoder Device

FIG. 1 shows a system 10 according to one embodiment of the present invention. This system 10 includes a remote computer 20 and an integrated device 64, including having means for on-board control and monitoring of each subsystem or component. Further, with wireless data ports, the device 64 can be monitored and controlled by virtually any handheld or mobile device, a host computer in a central location, or over the Internet.

Each subsystem including the optical reader 13, the encoder 30 and the PDT 21 of the integrated device 64 comprise features for enabling a key aspect of mobile RFID transponder encoding, reading, and commissioning. An on-board power source, such as a rechargeable lithium-ion battery enables freedom of movement, as does means for wireless connectivity to a data network such as the 802.11 wireless-LAN (Wi-Fi) standards-based communications protocol. However, a conventional power source that requires connectivity to a power-grid and a cable-based data network connectivity link would work under certain circumstances.

As with all ESD-sensitive equipment, care must be taken to avoid a build-up of damaging electrostatic charges. Accordingly, in certain embodiments charge is removed using a variety of conduction methods including wiping, air, and humidity controls.

In some embodiments, the device 64 adapts to use a particular type of RFID transponder. One type of suitable RFID transponder is model number AD-220 from Avery Dennison of Brea, Calif. or, alternatively, Raflatac model 300846 from Tampere, Finland. Such a transponder is die cut and adhered to release liner. Additionally, wireless sensors are manufactured to specifications that are compatible with the specific encoder, including such specifications as core diameter, outer diameter, and web width. Alternatively, certain steps are required to prepare a standard roll of ALL-9338-02 transponders for use in an automated encoder, including unrolling from a large roll (up to about 6-inches in core diameter) onto several smaller rolls having a smaller core diameter (of about 1-inch to about 2-inches in core diameter).

In certain applications passwords are encoded into transponders or wireless sensors when they are commissioned. Passwords are safeguarded using cloaking, obfuscation, cryptographic techniques, secure and trusted channels, locked memory, and other methods that are commonly used to protect confidential information. Passwords are generated or retrieved from data encoded in an RFID transponder to generate an index into one or more databases that contain a one dimensional array of passwords, a two dimensional array of passwords, a multidimensional array of passwords, or an array of actual or pointers to algorithms used to generate passwords from transponder data, for example. Alternatively, cryptographic algorithms are used generate passwords from transponder data.

Figure 5:
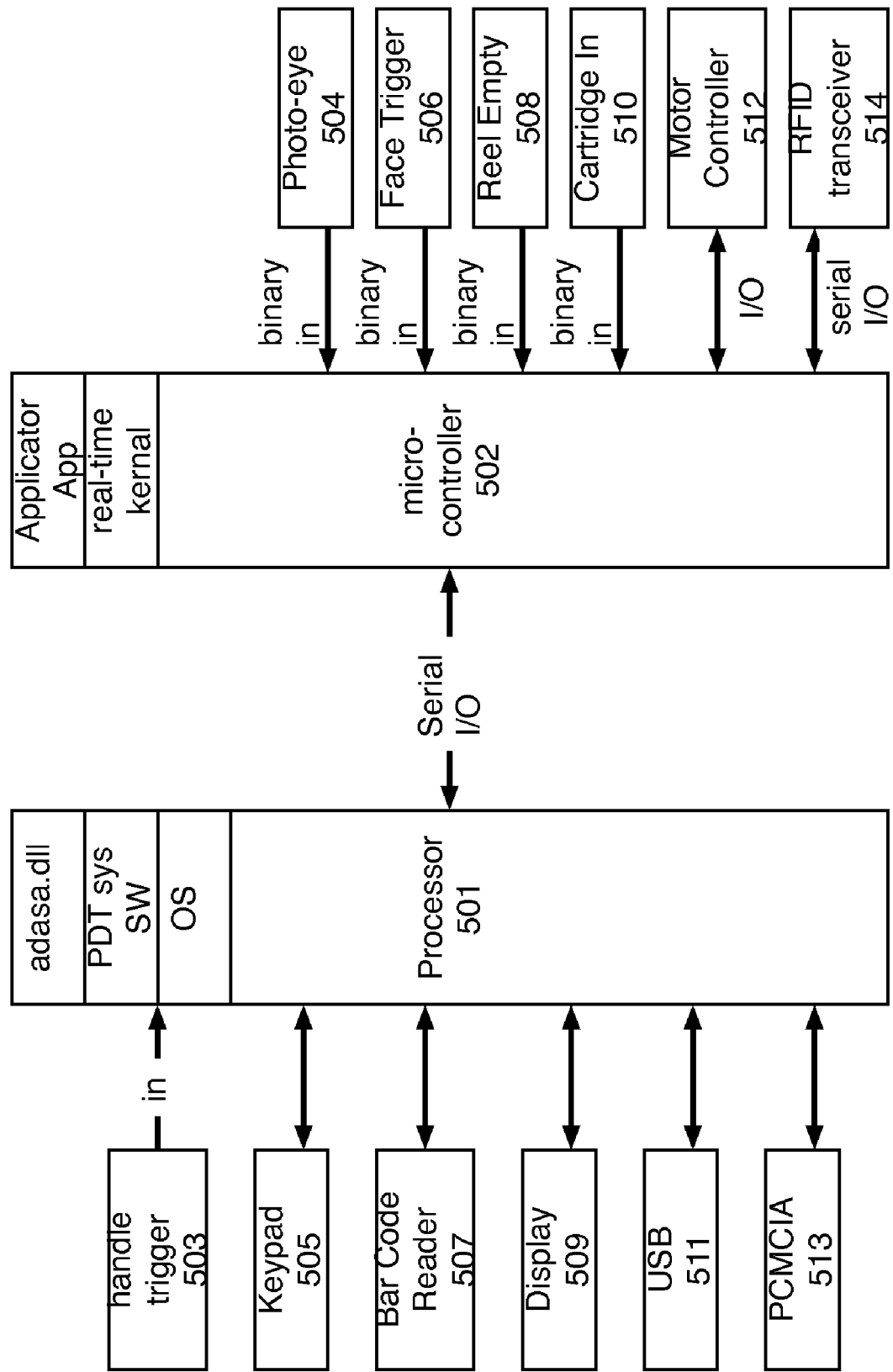
FIG. 5 is a block diagram of a processing system according to one embodiment of the present invention.
Figure 6:
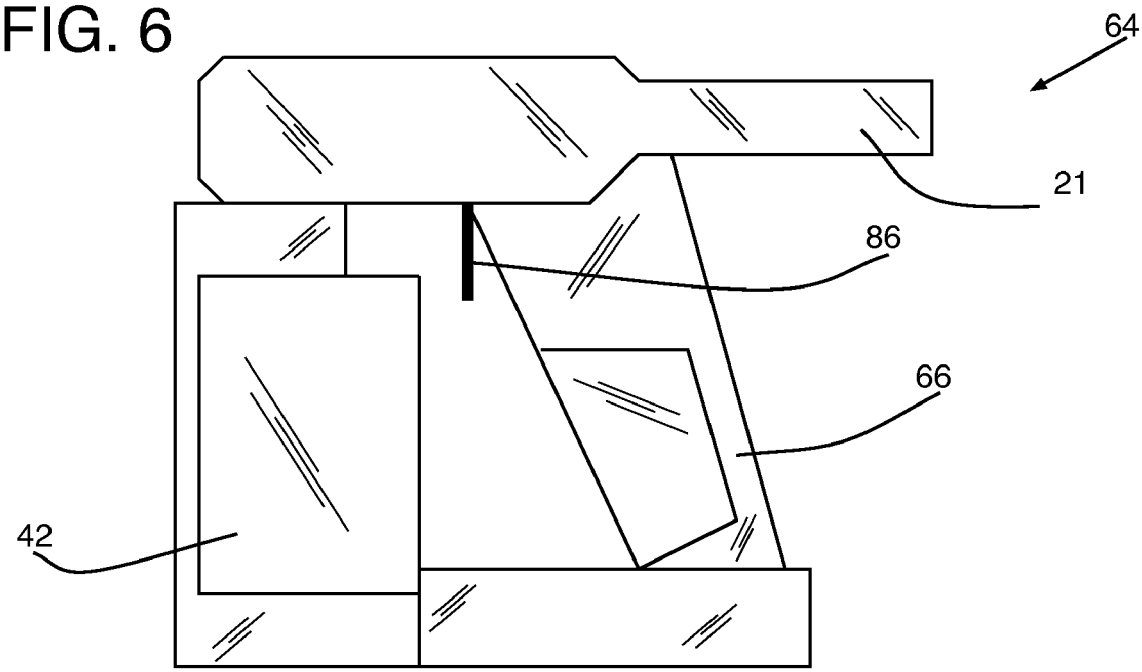
FIG. 6 is a left-side view of a device according to yet another embodiment of the present invention.
Figure 7:
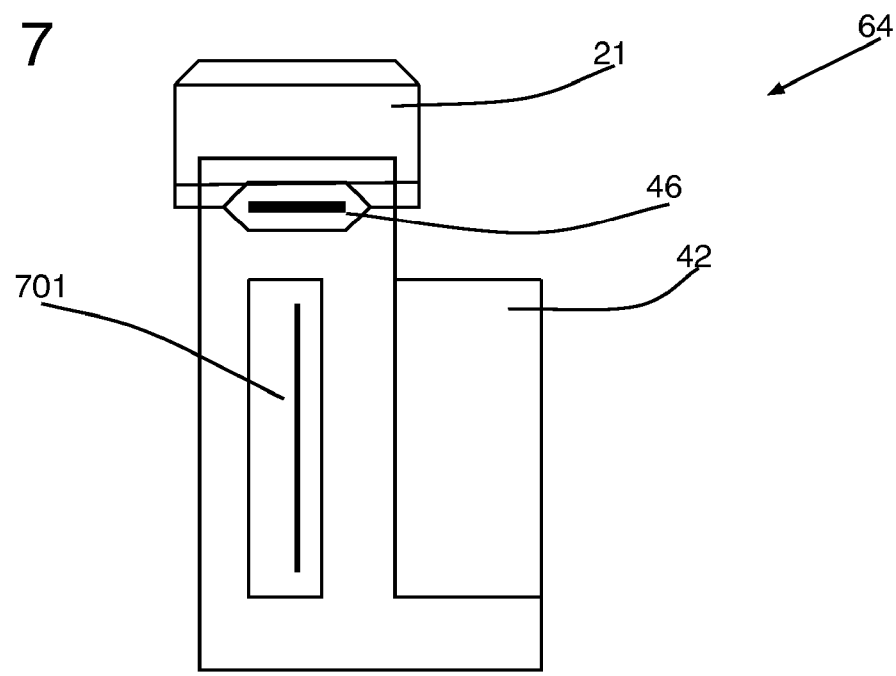
FIG. 7 is a front view of the device of FIG. 6.
Figure 8:
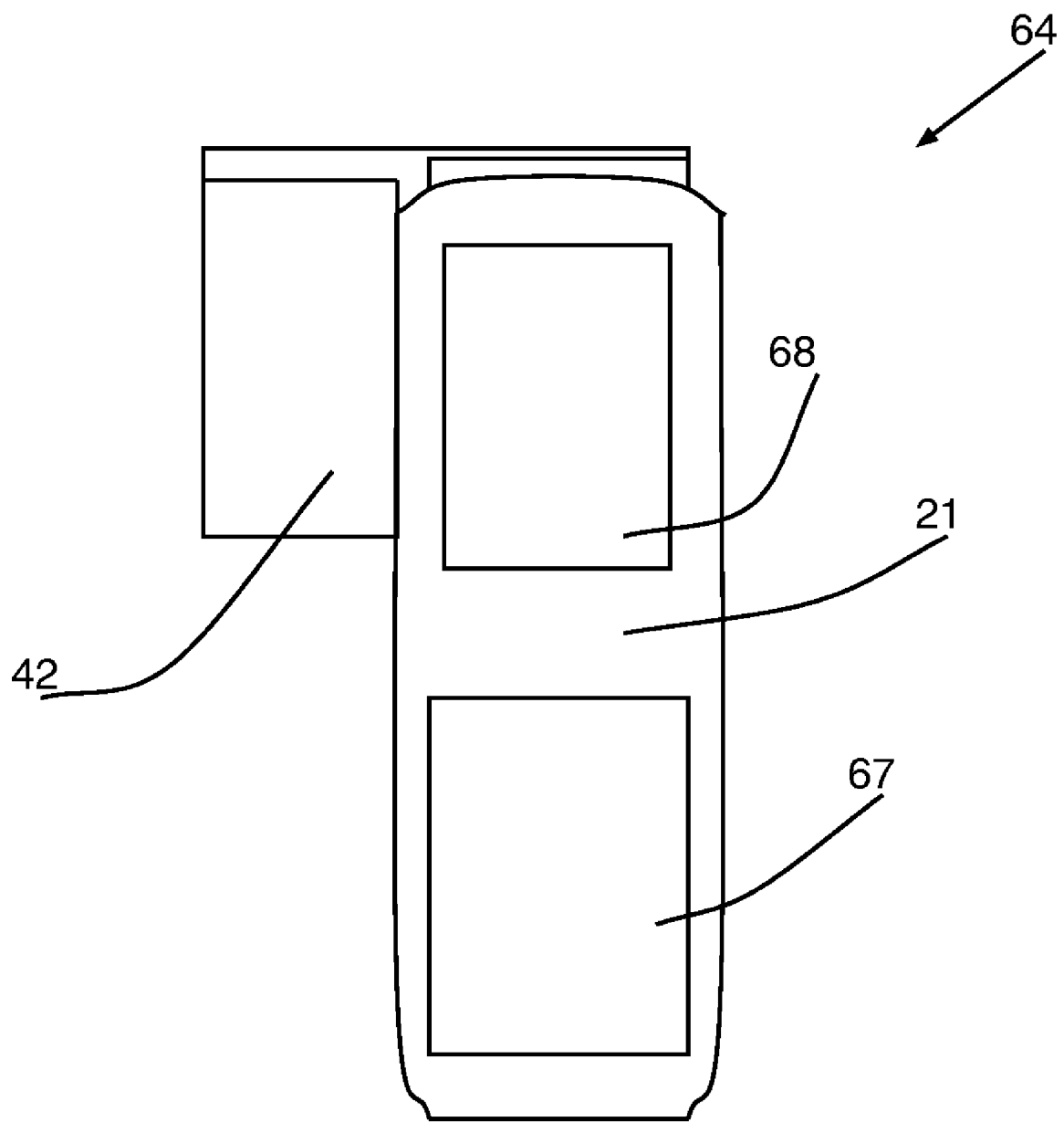
FIG. 8 is a top view of the device of FIG. 6.
Figure 9:
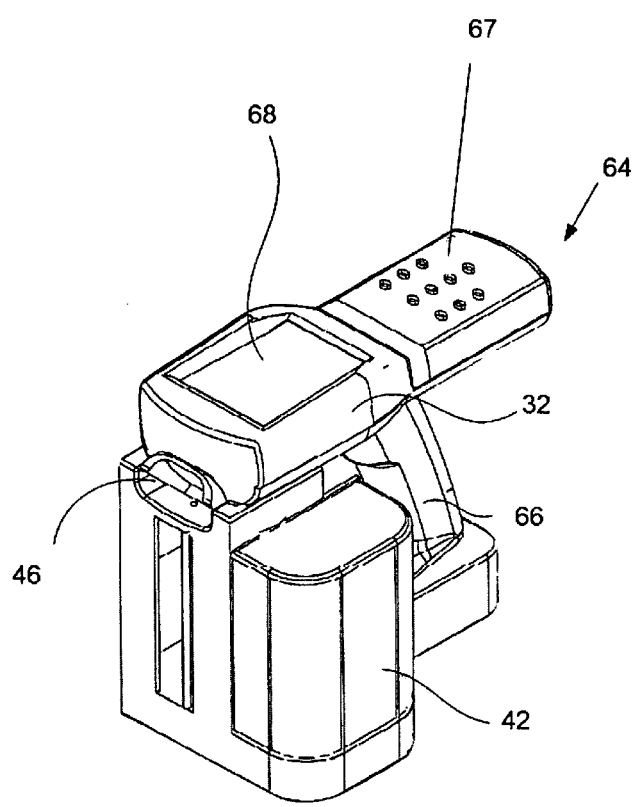
FIG. 9 is front-side perspective view of the device of FIG. 6.

FIG. 5 shows a possible logic relationship for modularized control programming or software for an integrated device 64. The processor 501 receives input from an operator via a handle trigger, which is controlled by the handle trigger module 503. Similarly, the processor includes interfaces to logic modules for each hardware component or sub-component including a user-interface keypad (module 505), bar-code reader (module 507), USB-port (module 511), PCMCIA slot (module 513), and a display output (module 509). The processor further includes an operating system (OS), a portable-data-terminal interfacing control logic module, and proprietary software or control logic for such functions as secure data encryption, for example. A micro-controller 502 bi-directionally communicates with the processor 501 and executes data transfer and command subroutines to various sensors, ports, and hardware systems integrated in the device 64. Accordingly, logic, command, or software modules correspond to the sub-systems including the infra-red photo eye of the optical scanner (module 504), the transponder-face transfer mechanism for extracting a commissioned transponder from the device (module 506), a sensor detecting an empty transponder-supply reel (module (508), a sensor detecting that a cartridge is loaded to the device (module 510), a motor controller (module 512), and an RFID transceiver (module 514). The micro-controller further includes a real-time kernal and control or command system such as an applicator application algorithm.

In the following disclosure, FIGS. 2-4 and 6-9 show various physical representation of a device 64 and its internal components and assemblies. General reference to these various views of alternate embodiments, the physical layout and relationship of internal components, and the omission of components should not be interpreted as limiting the scope of the invention. In some figures components are omitted for clarity.

Encoder

The encoder recognizes which transponders have been recently commissioned to filter out their response to interrogations to other transponders. The encoder can modulate its transmitted radio power to affect the range and signal to noise ratio of their coupling to wireless transponders.

RFID Module and Antenna

The encoder further includes an RFID module 63, such as an M8 UHF module from SkyeTek of Westminster, Colo. or an MP9311 UHF reader module available from Sirit Technologies of Carrollton, Tex. The UHF RFID module transmits and receives radio signals through antenna 62 read and encode RFID transponders. Certain preferred embodiments utilize an antenna system that is capable of both near and far field operation. Near field is used to communicate with a single RFID transponder at a time. Far field interrogation is performed at a second (higher) power level to read or possibly to encode RFID transponders at a distance. Far field reading is sometimes useful as a final verification step in a transponder commissioning process or in a mode where the operator is sweeping an area with an RF interrogation beam, looking for an RFID transponder that is encoded with particular data of interest.

Trigger Switch

The trigger 86 allows for operator-selected override of the reel of RFID transponder stored in the supply or source reel 44 in the cartridge 42. A drive motor 76 coupled to a dual output shaft gearbox drives the source transponder reel via an intermediate take-up reel gear interface at the cartridge mouth. Another gear assembly along with a spring-couple advances and positions the tag-feeder paddle 84. A tag sensor 74 detects the location of the RFID transponder to-be commissioned by the YAGI antenna 62. As the reel of RFID transponder advances inside the encoder, the lead edge passes the ratchet post 85. If the now-commissioned transponder is read by the antenna as "good", a ratcheting-back torque spring 88 enables a peel device 73 and its associated tag peel edge to engage, forcing the commissioned transponder to peel away from the carrier layer, which continues on to the take up reel 43. In the event of a "bad" transponder—that is, the antenna reads the RFID transponder and determines an error has occurred—the peel edge device 73 does not engage, allowing the defective transponder to remain on the carrier layer and proceed to the take-up reel. Once the good transponder is removed from the encoder, the transponder sensor detects the condition and enables the encoder to stand-by for the next event. Transponders are read, written, and verified when an operator initiates an action such pulling the trigger 86, pushing a button, or some other command sequence.

The trigger member 86 couples with an electrical switch having one or more stable positions that are detectable by the PDT 21. The PDT 21 reports trigger state changes to the encoder 30 or to a central processor on the device 64 to coordinate and synchronize the overall operation of the device 64. In certain modes of operation the trigger switch state is associated with range information from the sensor panel to execute preferred functions at preferred ranges at preferred times. The result is a trigger member whose function is selective and dependent upon detected range from a transport container. The advantage of doing this is operator productivity. One trigger is used to execute several different functions that are typically involved with RFID tagging including the tagging of bar-coded cartons that have been selected to receive wireless transponders. Thus, in one mode, the operator's engagement or pulling of the trigger signals the encoder to commission and dispense a transponder. In another mode, the categorization of "Close Proximity" range is reserved exclusively for programming, applying, and verifying one transponder. In another mode, when certain programmable conditions are set, pulling the trigger at a "Far" range causes the PDT 21 to read a bar code with the optical reader 13. This bar code or other print-label information is decoded and transmitted to the encoder 30. In another mode the decoded bar code information is processed by the portable data terminal (PDT) 21 to ensure that the RFID transponder is being encoded with data that correlates properly with the carton it is being attached to.

Immediately following a Trigger Event and the commissioning of a transponder, another transponder is preferably pulled into position by a drive mechanism in the encoder 30. For example, the encoder 30 couples torque to the take-up reel. Known transfer mechanism link and transfer the mechanical power between a motor housed in the encoder and the cartridge. These drive and torque couplings include belts, gears, or clutches. The drive lobe can be either on top on the bottom. Other coupling arrangements are also possible with consideration to the necessary engagement of mechanical features and the easy removal and replacement of cartridges. A peel-edge plate 73 is preferably moved into an operating position after the cartridge is coupled to the encoder. The positioning of the peel edge is preferably automatic, but can also be performed as a manual secondary step by the operator that installs fresh cartridges.

Paddle and Thumper

To enable attaching of commissioned transponders to a container, the device 64 includes an electromechanical mechanism that dispenses commissioned transponders via transponder-dispensing port 701 to a surface on a carton using tensile extraction. The electromechanical mechanism, in one alternative embodiment, includes a paddle 84 that wipes across the face of a transponder while the operator holds the device 64 firmly against a carton wall. Certain preferred paddle designs have more than one operative surface. A preferred embodiment is dual-ended to enable a first transponder to be wiped onto a carton while a second transponder is being positioned for attachment.

Figure 4:
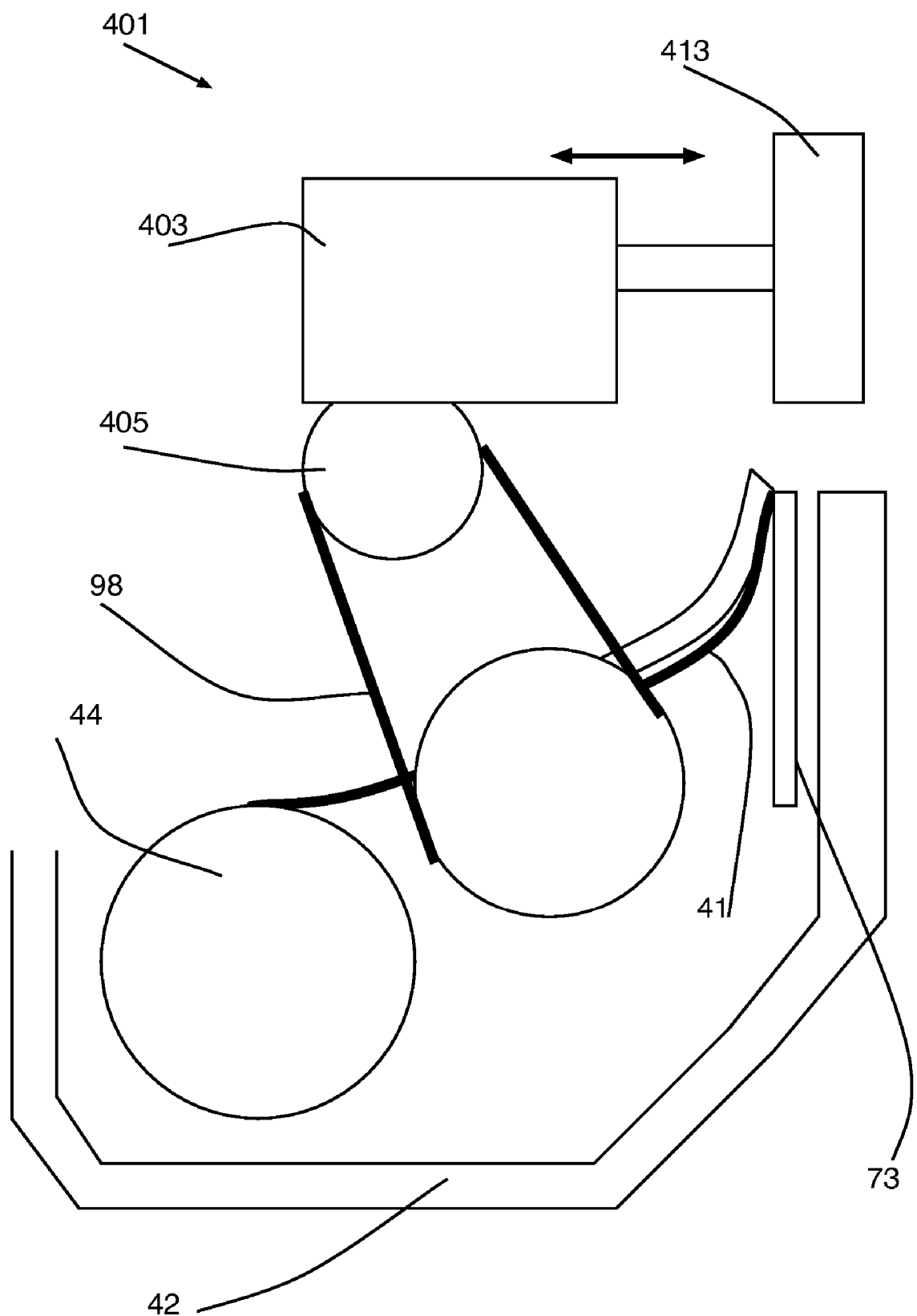
FIG. 4 is a partial side view detailing an alternative embodiment of the device of FIG. 3.

Instead of a paddle, which uses rotary motion to affect commissioned transponder transfer from the encoder 30 to a container, an alternative electromechanical mechanism transfers a commissioned transponder via port 701. A thumper or a plunger mechanism 401 (as FIG. 4 shows) may be alternatively employed to transfer commissioned transponders to a selected surface. A thumper or plunger mechanism 401 is a mechanical device that travels in a linear fashion to apply force via a strike plate 413, which in turn applies a pressure to the commissioned transponder and thus activating a pressure-sensitive adhesive transponder to a transport container. The linear motion is propelled by a force created by a solenoid 403 or a motor and a power coupling through mechanical cam, belts 98 or gears 405. Major considerations include the maximum speed of application and the power required to operate the mechanisms through their tag attachment cycles. Accordingly, when the transponder is in position, one edge of the transponder remains in contact with the conveying release liner 411. This contact point is used to hold the transponder in position. When the paddle 84 or strike plate 413 cycles it will adhere the free portion of the transponder to the carton.

The application of the transponder may optionally include an additional intermediate step to ensure full adhesion of the transponder to the carton. This step may include a shifting action of the peel edge 73 parallel to the transponder being applied, utilizing the force of the applied transponder to pull the conveying release liner off the remainder of the transponder. This shifting action will be accomplished utilizing the force of paddle 84 or strike plate 413 to mechanically push the peel edge to pull the transponder away from the release liner. This action will be mechanically timed such that the edge is pushed away after the free edge of the transponder has been applied to the carton. Alternately, the shifting of the edge between its normal retracted position and its extended position may be controlled with an independent drive mechanism, who's movement is controlled via the on-board controller that will monitor the position of the paddle or strike plate and shift the peel edge at a predetermined position with respect to the paddle or strike plate.

In this operation, a drive wheel and belt provide the forward drive torque against which back torque device drags to maintain the proper amount of tension in the conveying release liner. An antenna is used to couple with RFID transponders at both near and far field positions depending on factors including the signal level driven into it by an onboard interrogator. An enclosure is a housing to contain certain preferred applicator mechanisms described herein. The enclosure preferably protects RFID transponders and wireless sensors encased therein from unauthorized interrogation, ESD, and mechanical damage. The enclosure preferably contains metal, carbon, conductive plastic, metal-plated plastic, or some other inexpensive, protective, mass-producible enclosure material.

Cartridge

The device 64 further includes a cartridge containing a plurality of RFID transponders. The cartridge adapts to releasably mount to the encoder 30. This way, as the cartridge 42 becomes depleted of blank transponders, a substitute cartridge can be rapidly connected to the encoder to minimize downtime. The cartridge further includes a take-up reel 44 for non-dispensed RFID transponders, a port for dispensing commissioned transponders, and a supply reel 43 for holding blank RFID transponders prior to commissioning.

Certain protective enclosures, such as cartridges 42 or magazines, are part of a family of interchangeable magazines of similar size, shape, and functionality, which are capable of housing and dispensing certain types, styles, shapes, and sizes of new or used RFID transponders. In at least one embodiment, the magazine or cartridge 42 includes a unique and embedded, RFID transponder, which enables automatic interrogation and tracking of cartridge 42. In certain embodiments, to minimize interference, the cartridge-specific and unique RFID transponder or RFID transponder operates in a frequency band that is different than the supply RFID transponder contained within the protective enclosure. Alternatively, other embodiments selectively interrogate cartridge identification transponders that operate in the same band as transponders within the cartridge that are to be applied.

The cartridge changeover time is preferably very short, requiring little effort. Cartridge 42 preferably bears an RFID transponder that is uniquely identifiable.

The benefits of a transponder cartridge are also realized in large transponder roll formats whereby rolls of ten to twenty thousand transponders can be transported in a convenient cartridge 42. A high-capacity cartridge that is magazine-fed for fixed applications such as high-speed assembly lines, where reliability and convenience are of the utmost importance, easily adapts to selectively and removably couple to the system 10 or device 64. In such examples, the high-capacity cartridge includes a cartridge-handle for carrying the cartridge to and from places of storage and use. The cartridge includes both a fresh-supply reel and a spent-supply reel. The high-capacity cartridge protects RFID transponders and wireless sensors encased therein from unauthorized interrogation, ESD, and mechanical damage. The high-capacity cartridge contains metal, carbon, conductive plastic, metal-plated plastic, or some other inexpensive, protective, mass-producible enclosure material. Certain preferred embodiments include communication between cartridge and encoder or other source of intelligence for security, authentication and verification purposes.

Battery

Certain encoders require replenishment of the battery or other internal, on-board power source, such as a fuel cell, or other energy storage technology. Accordingly, in some embodiments, the device 64 further includes a remote, selectively coupling base unit. The base unit enables a replenishment of magazines or cartridges, provides replaceable power sources, recharges the on-board power source, serves as a communications gateway, and provides a user interface for programming and maintenance of the encoder. For example, spare transponder magazines/cartridges are retained in cartridge pockets where they are protected from damage. Cartridges indicate their empty/full status with a visible indicator such as: an LED, an LCD, a mechanical flag, a window with a view into the source reel, or other such indicators that help an operator choose which cartridge from which to next consume transponders. The encoder, also, is retained by a protective pocket to prevent damage and to make any required electrical or mechanical connections to the base unit. In some embodiments a base unit mounts to diverse operating locations including various models of fork lift trucks. In such applications, the base unit includes a variety of wired and wireless communications options to enable omni directional communication with the encoder, cartridges, a host computer, vehicle mount terminal, a fork truck computer, or other relevant computing devices. The base unit includes a power system that is suitable for the application, including power filtering and energy storage capabilities such as batteries or fuel cells.

Sensor Panel

The device 64 further includes a sensor panel. For example, in certain embodiments a single sensor responds to changes in light, capacitance, pressure, acoustics, or optical path length to a transport container. In certain other embodiments, the sensor panel operates as a collection of sensors. Changes in capacitance are detectable using certain preferred QProx charge transfer capacitance sensors available from Quantum Research Group Ltd. of Hamble, England. Ultrasonic range sensors are available from supplier such as muRata Manufacturing Co., Ltd. of Kyoto Japan under the trade name Piezotite. Optical path length sensors are available from Keyence Corporation of Osaka, Japan. Sharp manufactures a compact distance measuring sensor GP2D02 that is responsive in the range from 5 to 100 cm. When a predetermined set of conditions is realized, sensor panel preferably triggers, enables, or selects a desired action. In certain preferred embodiments, proximity or contact of sensor panel with the targeted transport container causes a second type of Trigger Event, resulting in the application of an encoded transponder.

One use of the sensor panel includes determining or measuring the distance between the device 64 from other objects, such as a shipping container. In one embodiment, the sensor panel contains a micro-switch that indicates when the device 64 is being pressed against a solid surface. Range information is acquired and processed in real-time to determine if the device 64 is: in Close Proximity, Near, or Far from a transport container. In certain preferred embodiments device 64 is programmable to alter threshold distances between each range category. In certain preferred embodiments, device 64 is programmed to associate a preferred function with each range. In certain preferred embodiments, range category Close Proximity is associated with transponder programming and application functions. In certain preferred embodiments range category Near is reserved for transponder verification and/or reading functions; and Far is preferred for bar code scanning functions to verify that bar code information aligns properly with RFID transponder data.

In other embodiments, the sensor panel adapts to be responsive to colors or patterns. Upon recognizing pre-determined colors, patterns, or combinations of both, the device 64 launches a pre-programmed routine of actions and responses including the detection of the correct locations for applying good transponders and separate locations for discharging bad transponders. Accordingly, the device can therefore be programmed to not discharge and not commission a transponder if certain conditions are not met. In this configuration, the device 64 greatly improves the accuracy of commissioned transponders by significantly reducing the propensity for human error.

The on-board memory and software, according to an alternative embodiment of the present invention, configure to adapt and learn unique color and pattern combinations. This information, can then be stored and up-loaded, enabling an exchange of the learned information with other devices.

Optical Reader

One possible optical reader 13 that integrates with the device 64 includes an imager, or a flying spot of coherent light, or a retro-reflective optical path. The optical reader adapts to recognize bar-codes, alpha-numeric sequences, and other common print-labeling characters or codes used typically in this art. The optical reader communicates, either directly or via an on-board processor to the included encoder 30. The optical reader includes a scanning port 46 or window, which enables spatial images or light reflected from a linear or two-dimensional bar-code label, as is well understood in the art.

PDT

The various subsystems of system 10 or device 64 communicate with a remote computer and include options to physically, electrically, and communicatively integrate with a portable data terminal (PDT) or a mobile computing platform including PDT 21. Certain PDT's have a variety of wireless connections including PAN and WLAN. Certain PDT's include a barcode scanner comprising a laser, an imager, or other means. In other suitable PDT's an RFID interrogator and antenna are built-in, while certain others have a card slot manufactured to a standard such as PCMCIA, CompactFlash, or Secure Digital, into which interrogator/antenna may be plugged. An example of such a card is the MPR 5000 that plugs into a PCMCIA Type II slot and is available from WJ Communications of San Jose, Calif. The MPR 5000 is compatible with handheld computers such as the Hewlett Packard iPAQ5550 or other models that accommodate smaller card-form factors, enabling them to read and write EPCglobal or ISO 18000 compatible UHF RFID transponders.

The system 10 integrates a stand-alone PDT 21. In this arrangement, the PDT computing system is independent from the encoder/reader subsystem 64. This design has the advantage of easily porting an applicator pod to different types of PDT platforms. This simplicity is achieved through the use of a common serial port to connect the two subsystems. In certain preferred embodiments, subsystem 64 includes standard applications programming interface (API) that includes certain commands and protocols for the PDT computing system 21 to interface to and control. The PDT computing system has PDT I/O points to sense and control operations. The encoder/reader subsystem 64 has corresponding I/O points. This system architecture is one of many possible designs to achieve the purposes stated herein. There are other possible I/O points, means of processing, and system partitioning.

Other events, information, and status—such as changes in transponder readiness, transponders remaining on the source roll, remaining charge in the battery, changes in range-status between certain predefined states such as Close, Near, and Far—are communicated to the associated PDT. Other possible information, including certain power management functions, commands, status, and data-to-be-encoded into each readied transponder, is provided to the PDT over a wireless connection. Such a configuration puts the encoder in the role of a peripheral device to the PDT 21, with PDT 21 managing the primary user interface and most computation functions.

In some embodiments the encoder adapts to exchange information with a host device, including a PDT, in either a batch-mode or through a real time connection. Batch mode uses a periodically connected data transfer channel such as a wired connection. Certain wired connections include serial data, infrared, optical, Universal Serial Bus, a parallel port, or other physical data connection. Certain real-time connections include wireless data links including Personal Area Network (PAN), Wireless Local Area Network (WLAN), and Wide Area Network (WAN). Certain PAN connections include Bluetooth and Zigbee. Certain suitable WLAN connections include IEEE 802.11a, IEEE 802.11b, and IEEE 802.11g.

Interrogator Apparatus

Working as a stand-alone device, or combined with an encoder, certain embodiments of the present invention include an RFID transponder reader, also called an interrogator. The interrogator, in one embodiment, is a physically separate device that is solely in wireless communication with the encoder. In another embodiment the interrogator includes a wired connection to the encoder. In yet another embodiment, the interrogator connects to the encoder via an intermediate processor, such as a remote computer, or some other intermediate device. In yet another embodiment, the intermediate device is a shared processor in a physically integrated encoder/interrogator apparatus.

Regardless of the physical configuration of the interrogator, its function is to encode and/or verify a RFID transponder's (including wireless sensors) functionality. Certain embodiments use a mobile handheld reader to verify transponder functionality after carton attachment. Certain handheld readers also read bar codes that either partially or completely specify the data that is to be programmed into a transponder. Accordingly, an optical path from the interrogator to a location for reading bar code labels is used to identify certain information about the objects or containers that are to be tagged. Additional transponder encoding instructions and data is acquired through an integral network interface or a batch mode memory in the interrogator.

In certain embodiments, a shield structure incorporated in a combined interrogator/encoder prevents RF fields from interrogating or reprogramming RFID transponders yet-to-be-commissioned that are resident in the combined interrogator/encoder device.

In one embodiment, a contact image sensor (CIS) 90 or a linear optical array is used to scan along the length of an RFID transponder before it is applied to a container. CIS 90 produces a video stream that is decoded and then interpreted and stored by an on-board Computer 63. CIS or a similar linear array sensor is capable of reading both linear and two-dimensional bar codes. In certain embodiments, CIS reads two-dimensional bar codes before attachment to inlay or transponder. The on-board computer creates a logical association between bar codes and the commissioned RFID transponder. Encoder 30 reads and associates all bar code symbols on a single segment with the RFID transponder or inlay adhered to it.

When an operator pulls the trigger 86, which is either a mechanical trigger or an electromechanical device, the on-demand commissioning of the RFID transponder occurs and nearly simultaneously is pressed against a container within a fraction of a second. In certain embodiments, mechanisms internal to encoder transfer mechanical force to the RFID transponder tag through the use of air, springs, motors, plungers, elastomers, or other energy storing or delivering methods. Reloading of the next tag (next transponder) and readying of the system are performed within a time interval that is acceptable to the operator and enables a high degree of productivity for tagging cartons, pallets, or other transport containers.

In certain embodiments of a combined interrogator/application, a trigger 86 couples to an electrical switch having one or more stable positions that are detectable by a controller. In certain modes of operation trigger-switch state is coupled with range information from a sensor suite to execute functions at predetermined ranges at predetermined times. The result is a trigger that functions based upon detected range from a container or other object of interest. This advantageously improves operator efficiency and productivity as one trigger executes several different functions that are typically involved with RFID tagging including the tagging of bar-coded cartons that have been selected to receive wireless sensors.

Verification of bar code occurs either before or after an RFID transponder is commissioned and the transponder applied to the container by merely stepping back to at a point where the sweep angle of a laser beam or field of view of an imager can read a bar code label. In certain embodiments ranges shorter than that, but not in Close Proximity, are used for sweeping a radio frequency interrogation signal across the faces of multiple cartons to assure that the correct transponders, the correct number of transponders, and the correct data within that transponders were all properly programmed.

In certain embodiments Close Proximity range is reserved exclusively for programming, applying, and verifying one transponder, all in a single pull of trigger. In other embodiments, the interrogator includes programmable conditions that enable Trigger Events to interact with external devices or nearby equipment. For example, at a predetermined range from the interrogator, activation of the trigger causes the encoder to transmit a coded signal to an external device as an indication of an operator action: at a Far-range the signal to requests an external device to read a bar code and the bar code information is decoded and transmitted back to encoder. In another embodiment, decoded barcode information is processed by a portable data terminal (PDT), a vehicle mount terminal, or other computing device.

The on-board computer 61 controls the operation of the RFID Interrogator Module 63 to read, write, and verify RFID transponders, inlays, transponders, and wireless sensors that are applied or are within range of the interrogation fields produced by antenna 62. The encoder 30, capable of reading multiple RFID transponders near it, can, in certain embodiments, produce a linearly polarized radio field via the internal antenna 62. In another embodiment, the internal antenna produces a horizontally polarized RF field. A commissioned transponder can be read both before and after it is applied to a transport container. When multiple transponders are within the interrogation field of the encoder 30 with an interrogator module 63 the on-board computer 63 determines which transponders are commissioned and dispensed versus those transponder that have not. In certain embodiments, the on-board computer maintains records of transponders recently applied in order to properly determine how to interact with each transponder in the field of the internal antenna or other antennae under the control of RFID Interrogator.

In one possible embodiment, the interrogator/encoder utilizes preprinted information on a set of RFID transponders. The pre-printed information includes one or more logos, an EPC-global Seal, and other informative alpha-numeric or bar-code data. Certain embodiments have a motorized tape drive and dispensing system. Certain embodiments contain some or all of the following: a rechargeable battery, an operator display, a wireless interface, a network stack, an IP address, a PCMCIA port, a Compact Flash port, a USB cable, a serial cable, a dock port, a window to allow the operator to view the transponder attachment process, or a bar code scanner.

One suitable interrogator includes model MP9311 available from Sirit Technologies of 1321 Valwood Parkway, Suite 620 Carrollton, Tex. 75006, USA. Other RFID transponder or wireless sensor interrogator modules with other feature sets are also possible for use in the interrogator/encoder.

Figure 2:
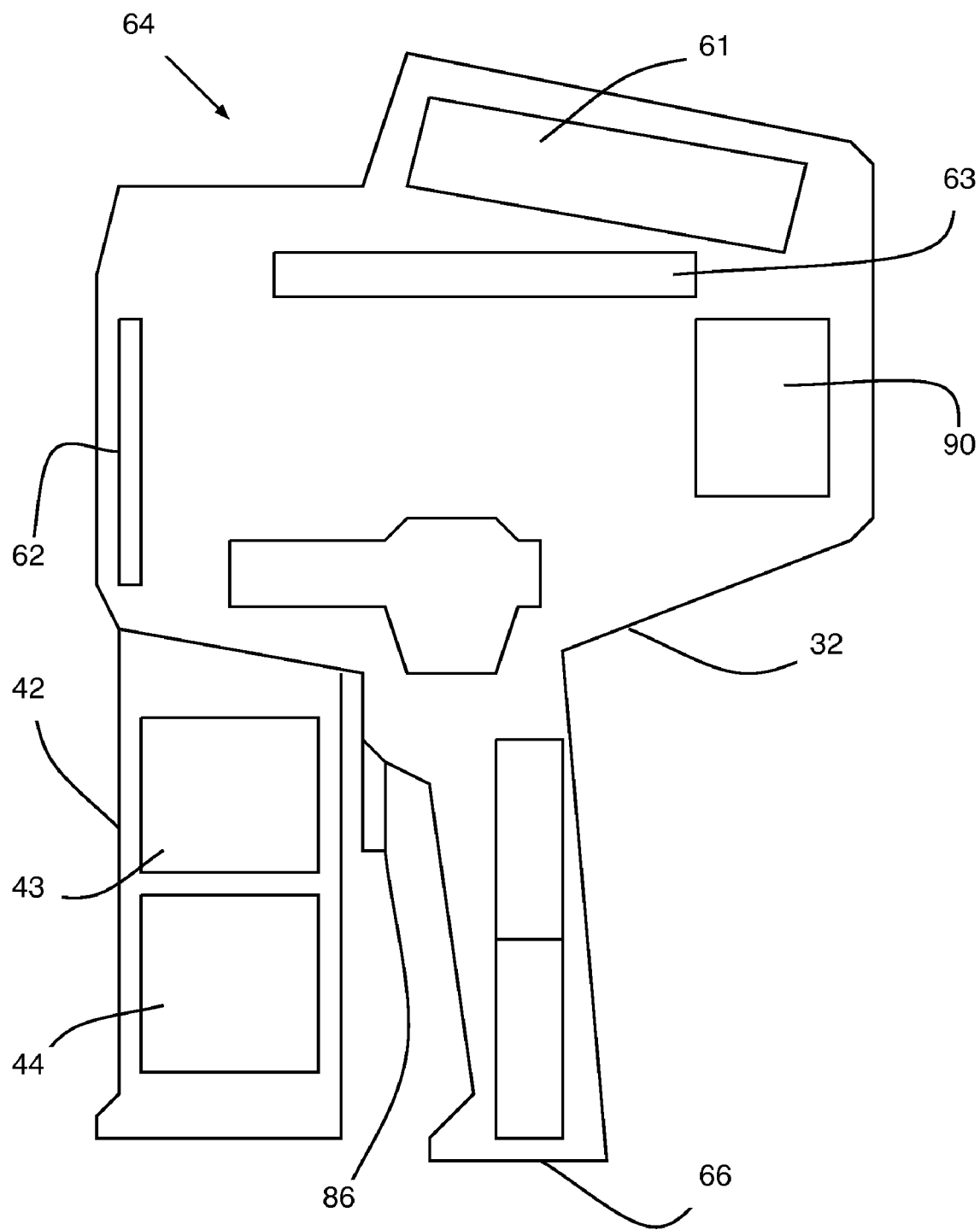
FIG. 2 is a schematic side view of a device according to one embodiment of the present invention.
Figure 3:
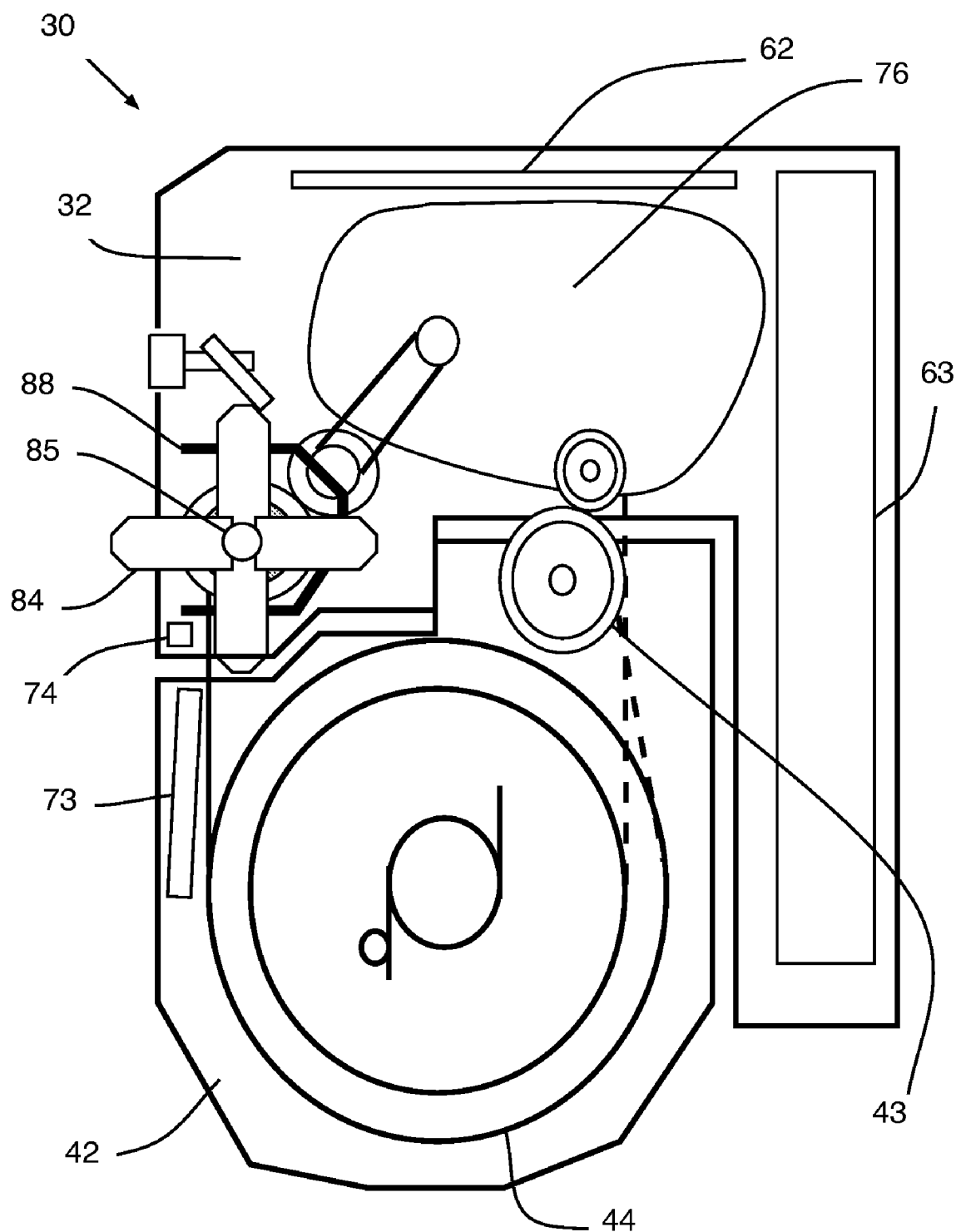
FIG. 3 is a schematic side view of a device according to another embodiment of the present invention.

FIGS. 2 and 3 show one possible interrogator/encoder 64 according to the present invention. The interrogator 64 comprises a housing having a user input device 67, such as a key pad or key board, and a user output device, such as an LCD screen, for displaying optically scanned label data, RF interrogated data from a transponder, and other information including on-board diagnostic functions, bios status, and external information provided from a remote computer as sent over a wireless network, for example. A handle structure 66 enables point-of-use deployment while cartridge 42 enables on-demand commissioning of RFID transponders, which are dispensed from the transponder port 46. In this embodiment, an integrated YAGI antenna 62 creates a large forward-looking main lobe of radio frequency energy for interrogation of commissioned RFID transponders. The internal antenna also produces side lobes of RF energy that although attenuated from the main lobe by several dB, couple enough power into nearby readied transponder to interrogate and write to it.

A reflector passively reflects RF signals from an upper side lobe downward toward readied transponder. Backscatter from transponder propagates to both the antenna and reflector for processing by the interrogator. Having such an antenna embedded in the PDT 21 and mounted to the structure of the encoder housing enables the PDT to encode and verify readied transponder while commanding the encoder to commission and dispense a transponder when a particular Trigger Event or a predetermined range status change occurs.

An antenna, or alternatively, a leaky coax or a near-field coupler located outside of the protective enclosure in a location very close to the transponder attachment zone in front of tamp head or transponder application roller and holding rollers or hammer.

In some embodiments the antenna is a patch antenna with a radiation pattern toward the transponder attachment zone. In other embodiments the antenna is a near field coupler. Alternatively, leaky coax, a type of coaxial cable having slits, slots, or perforations that allow radio frequencies to leak in or out, is used in encoders according to the present invention. A coupled-mode cable, which does not radiate as well as radiating-mode cable, is constructed with closely spaced slots in a corrugated outer conductor. Radiating-mode cable typically has a foil outer conductor with non-uniformly spaced slots arranged in a periodic pattern. Coupled-mode cable is a slow-wave structure. In free space its external fields are closely bound to the cable and do not radiate, except for minor end effects according to "Prediction of Indoor Wireless Coverage by Leaky Coaxial Cable Using Ray Tracing" by Samuel P. Morgan of Bell Laboratories, Lucent Technologies.

In certain embodiments an interrogator drives a signal into a leaky coax that is terminated in a purely resistive load of about 50 ohms. An RF-switch selects between radiating and non-radiating loads including an antenna or leaky coax and, therefore, avoids mismatched load impedance.

In other embodiments the internal antenna is a patch antenna with its strongest lobes oriented toward the transponder holding and placement area in the region of holding rollers. The Antenna or leaky coax work with an interrogator to produce electromagnetic fields to interrogate, program, and verify wireless sensors. A Shield prevents interrogation or programming of RFID transponders until they arrive at separation roller or tag peel-edge. A reflector is used in certain embodiments to reflect RF radiation toward a readied transponder. In the event that verification fails, the operator is informed that the bad transponder (or inoperable transponder) is to be discharged onto a surface of a third object other than the encoder or the transport container, for post-mortem analysis.

D. Method of Operation

The mobile encoder 30 is activated (turned on) when an operator selectively depresses a combination on/off-next switch. However, depressing the on/off-next switch for about three seconds or longer results in a sleep-mode cycle that can be interrupted by re-pressing the on/off-next switch. In sleep mode the operator indicators (such as LEDs) will turn off. If active, the mobile encoder system-ready LED illuminates and connects to the assigned network. Network connectivity results in the illumination of both the system-ready LED and the data-ready LED. The encoder receives commands and data via the wireless link from the remote computer or host network computer. The data represents information to be encoded on an RFID transponder. The information is stored in the encoder's on-board memory and the transponder-ready LED rapidly blinks green (cycles on/off to pulsate). An RFID transponder is moved from within the cartridge to a position on the top edge of the cartridge for encoding in the encoder and the transponder is encoded with the appropriate information. The transponder is tested and if it is good—contains the data and encoding was successful—all three indicator LEDs indicate a solid-green color. The operator removes the encoded RFID transponder from the encoder and places it on the container of interest.

In the event that the encoding process failed, the bad transponder is detected and retained by the encoder, where it remains on the take up reel 44 inside the cartridge 42. The take up reel also collects the release liner as the encoder 30 dispenses good transponders (properly encoded RFID transponders). The take up roll returns to a re-cycling center where components are re-used or recycled as necessitated. Further, the re-cycling center can perform failure analysis on returned transponders.

Figure 10:
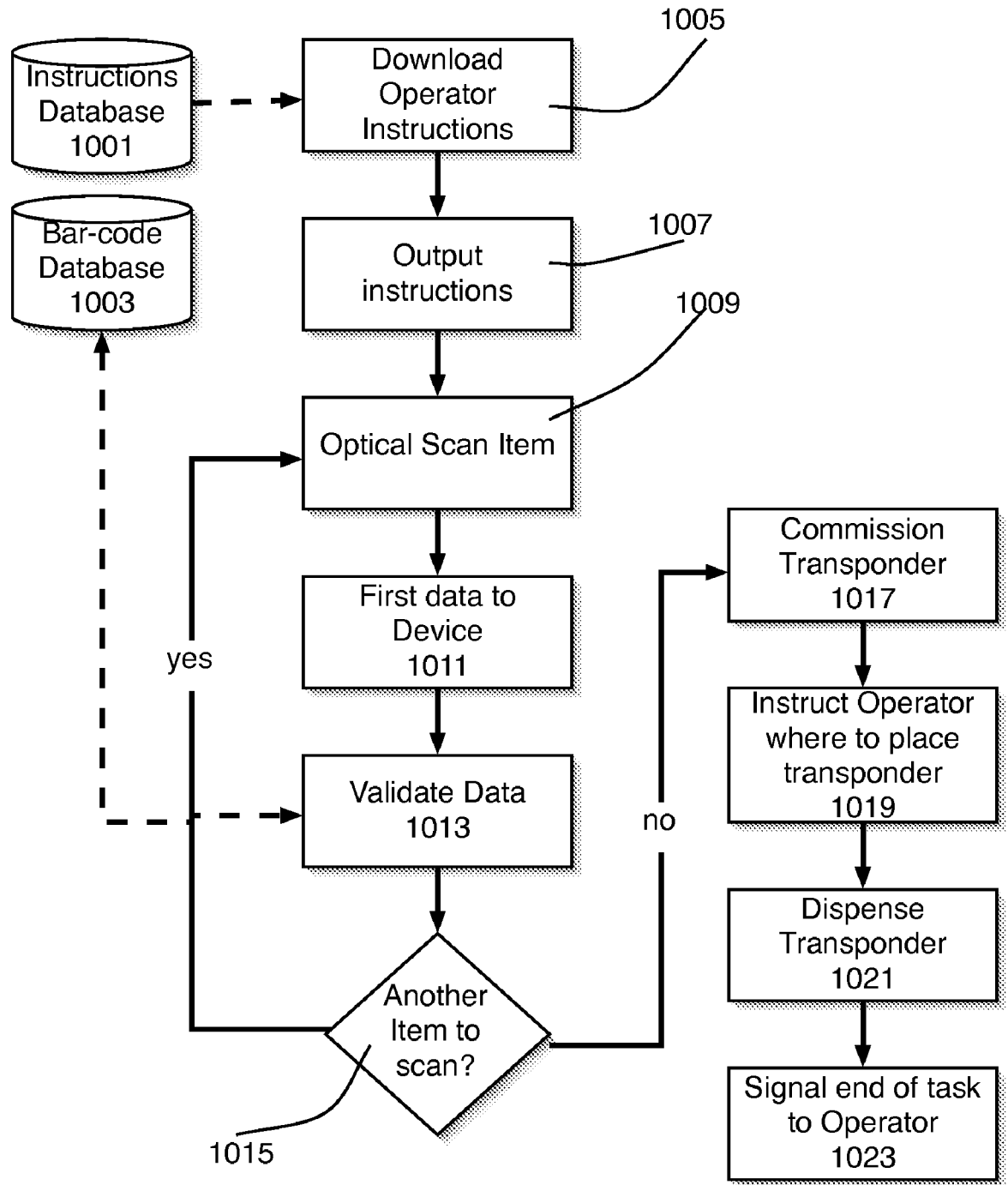
FIG. 10 is a flow chart of one method according to the present invention.

FIG. 10 shows a possible flow or logic diagram of one possible method according to the present invention. Accordingly, an integrated device for commissioning RFID transponders, such as device 64, wirelessly receives data from an instructions database 1001 residing on a remote or host computer system or other similar network device (block 1005). Alternatively, the data can be downloaded via a wired connection including a USB cable, for instance. The instructions relate to both items and operator instructions for a particular RFID-commissioning task. Via a user interface, which includes audible instructions and prompts on the screen of a personal data terminal associated with the device (such as the integrated device 64), a human operator is tasked (block 1007). The operator, following the audible and screen prompts, locates bar codes associated with particular physical items of interest and, once located, scans the bar code using the integrated optical reader by activating the trigger mechanism (block 1009). The device scans and reads the bar code and receives as a first data-set the bar-coded information and associates that information according to a heuristic or database downloaded in the PDT memory (block 1011). This first data-set is then compared to the instructions for validation and may be associated with the remote database via a wireless connection in real-time (block 1013). This sequence repeats as required to fill a particular job (block 1015). Then, the device commissions an RFID transponder (block 1017) from the on-board cartridge and sends instructions to the operator (block 1019). The instructions include where to place the commissioned RFID transponder. The operator, by activating the trigger mechanism, then dispenses the commissioned transponder directly on the surface of the package or container. The device's internal paddle or thumper assembly transfers the transponder to the surface without requiring the operator to touch the commissioned transponder (block 1021). Finally, the device sends a job-complete signal to the operator (block 1023).

Although this disclosure makes specific reference to a mobile device and mobile subsystems such as optical reader 13, encoder 30 and PDT 21, it is understood that the encoder can easily adapt and be readily configured to a fixed operating environment. For example, it can be mounted to a forklift truck or a high-speed conveyer line and maintain advantages of wireless communication, rapid change-over and other qualities as discussed and developed more fully in this disclosure.

Although the invention has been particularly shown and described with reference to certain embodiments, it will be understood by those skilled in the art that various changes in form and detail may be made without departing from the spirit and scope of the invention.

We claim:

1. A device for commissioning radio frequency identification (RFID) transponders, the device comprising:
    an optical reader means for reading bar-code labels; a processing means adapted to communicate with the optical reader means;
    an RFID-transponder commissioning means adapted to communicate with the processing means;
    a cartridge assembly adapted to selectively dispense a plurality of RFID transponders in response to at least one input, and the cartridge releasably coupled to the RFID-transponder commissioning means;
    a power-supply means in communication with the processing means, the power-supply means further adapted to provide power to the processor means, the optical reader means, the RFID-transponder commissioning means and the cartridge assembly;
    a trigger mechanism adapted to provide input to the processing means the trigger mechanism being in communication with a sensor means adapted to determine the distance the device resides from an object to be tagged, the sensor means further including operable states of Close Proximity, Near, and Far and further including means for preventing sequentially encoding and dispensing of an encoded tag if the operable state is Near or Far; and
    an output-display means for outputting data and adapted to communicate with the processing means.

2. The device of claim 1 further comprising wireless data-exchange means adapted to enable wireless data transfers to and from each the optical reader means, the processing means and the RFID-transponder commissioning means.

3. The device of claim 1 wherein the power-supply means further comprises a replaceable and rechargeable lithium-ion battery.

4. The device of claim 1 further comprising a keypad input means arranged on the chassis and in communication with the processing means.

5. The device of claim 1 wherein the output-display means further comprises a liquid-crystal-display panel.

6. The device of claim 1 wherein the processing-means further comprises a portable-data-terminal, the portable-data-terminal comprising
    a means for inputting data and
    a means for outputting data and
    the portable-data-terminal being adapted to releasably couple and obtain power from the power-supply means;
    the optical reader means further adapted to provide data representing the information from the bar-code label to the portable-data-terminal;
    the portable-data-terminal further comprising micro-controller means to transform the data representing the information from the bar-code label from a first state to a second state.

7. The device of claim 6 further comprising means for communicating the second state to the RFID-transponder commissioning means, the RFID-transponder commissioning means further adapted to encode the second-state onto the RFID transponder provided by the cartridge.

8. The device of claim 5 wherein the means for outputting data comprises a wireless data-sending transmitter.

9. The device of claim 1 wherein the RFID-transponder commissioning means further comprises an encoder means for modulating transmitted radio power and adapted to recognize recently commissioned RFID transponders and filter out responses.

10. The device of claim 1 wherein the trigger mechanism couples with an electrical switch having one or move stable positions, the one or more stable position being detected by the processing means.

11. The device of claim 1 wherein the RFID-transponder commissioning means further comprises an electro-mechanical mechanism including a paddle that wipes across the RFID transponder to enable transfer of a commissioned RFID transponder from the device.

12. The device of claim 1 wherein the RFID-transponder commissioning means further comprises an electro-mechanical mechanism including a thumper mechanism that exerts linear force on the RFID transponder to enable transfer of a commissioned RFID transponder from the device.

13. The device of claim 1 further comprising a sensor means in communication with the processing means, the sensor means being adapted to sense at least one condition.

14. The device of claim 1 further comprising a tensile-extraction means adapted to enable commissioned RFID-transponders to be discharged from the device using tensile extraction.

15. A device comprising:
    means for protecting RFID transponders within a replaceable enclosure;
    means for sequentially encoding and reading each RFID transponder;
    a sensor means adapted to determine the distance the device resides from an object to be tagged, the sensor means further including operable states of Close Proximity, Near, and Far and further including means for preventing sequentially encoding and dispensing of an encoded tag if the operable state is Near or Far;

means for dispensing an RFID transponder along a vector that is normal to the face of an object;

means for communicating to a wireless network; and a color or pattern sensing means.

16. The device of claim 15 further comprising a trigger means for enabling functioning dependent upon a detected range from an object.

17. The device of claim 15 further comprising a trigger means for selectively enabling execution of any one of a plurality of functions.

18. A method of dispensing RFID transponders mounted to release liner webbing, the method comprising:

providing a first data set;

providing an RFID transponder;

providing a reusable cartridge to contain at least one of the RFID transponders;

providing a means to sequentially encode the first data set and interrogate RFID transponders within the cartridge; and providing a device for transfer of sequentially encoded transponders from the cartridge onto a selected surface of an object along a vector that is normal to the selected surface, the device further comprising a color or pattern sensing means, a trigger mechanism being in communication with a sensor means, the sensor means being adapted to determine the distance the device resides from an object to be tagged, the sensor means further including operable states of Close Proximity, Near, and Far and further including means for preventing sequentially encoding and dispensing of an encoded tag if the operable state is Near or Far.

19. The method of claim 18 further comprising providing a processing means to store the first data set and wirelessly transmit the data set to a downstream processor.

* * * * *